Patented Jan. 11, 1949

2,458,772

UNITED STATES PATENT OFFICE 2,458,772

POLYMERIZING THE GLYCERYL ESTER OF LEVO-PIMARIC ACID-MALEIC ANHYDRIDE ADDUCT

Elmer E. Fleck, Silver Spring, Md., assignor to the United States of America as represented by the Secretary of Agriculture No Drawing. Application December 27, 1944, Serial No. 570,040

1 Claim. (Cl. 260—26)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to resins, and more particularly, to thermoset resins formed by the polymerization of the glyceryl ester of levo-pimaric acid-maleic anhydride adduct, and has among its objects the production of such resins for use as bonding agents, plastics, and as substitutes for rubber at high temperatures. Other objects will be apparent from the description of the invention.

The glyceryl esters of rosin have been known and used for some time as ingredients of varnish materials. Also, maleic anhydride has been added to mixtures of rosin and glycerin, and this resulting mixture heated to produce varnish materials. In all cases, the nature of the final product is dependent upon the order of addition of the ingredients and the amount of heat applied, the effect of the heating being to raise the melting point of the formed resin to produce a more desirable varnish material.

According to the invention, it has been found that thermoset resins are produced by esterifying substantially pure levo-pimaric acid-maleic anhydride adduct with glycerin and then heating the resulting ester at high temperatures to polymerize the ester into the resins.

The compound, levo-pimaric acid-maleic anhydride adduct, has three esterifiable acid groups and when heated with a molecular equivalent of glycerin, the three hydroxyl groups of the glycerin react with the acid groups of the adduct in the normal way to form the ester. The ester, which is formed at about 250° C. is heated further within a temperature range about from 250° C. to 300° C. with rapid polymerization then taking place as a result of a rearrangement of the ester. The reaction product first thickens and then goes through a rubber stage and a final gel stage before it sets. In the final gel stage, the product will no longer melt to a liquid but will soften and char when heated to very high temperatures.

The resin thus formed in the gel stage has a very high softening point of over 250° C., as measured by the A. S. T. M. method, and when cooled to ordinary temperatures is a hard material that is no longer soluble enough in ordinary varnish oils to be useful as such but instead has utility as a plastic. It is for this latter purpose that the adduct is first reacted with glycerin to form the ester, after which the ester is placed into molds of desired form which are then heated between 250° C. and 300° C. until the desired degree of polymerization takes place.

The ratio of adduct to glycerin may be varied about from 1 part by weight to 6 parts of the adduct to 1 part of glycerin.

The time of heating at the high temperatures to cause polymerization may be varied over wide limits from a few minutes to about five hours, the higher temperature requiring the shorter time.

The following examples are illustrative of the invention and the manner in which it may be applied in practice.

Example I

A mixture of 40 g. of levo-pimaric acid-maleic anhydride adduct and 10 g. of glycerin is placed in a 300 cc. flask equipped for mechanical agitation and connected to a still head. The flask is then placed and heated in an oil bath, the temperature of which is maintained at about 265° C. ± 5° C. The temperature of the melted reaction products in the flask is about 250° C. At the end of about 5 hours of heating, the acid number of the product is 78 and the product is a mobile liquid at the reaction temperature.

The temperature of the bath is then raised to about 275° C.±5° C. and after about four hours of heating at this temperature the product becomes an elastic gel. This hot gel is removed from the flask and cooled. At room temperature, the resin is very hard. It is insoluble in water, alcohol, acetone, chloroform, benzene, ligroin, methyl alcohol and acetic acid. Hence, marked polymerization has occurred. On prolonged standing in benzene, chloroform or acetone, the product swells but does not go into solution.

Example II

A mixture of 40 g. of levo-pimaric acid-maleic anhydride adduct and 20 g. of glycerin is heated at about 265° C.±5° C., as in Example I, for about 5 hours. The product is a mobile liquid at 250° C. and has an acid number of 28. The bath temperature is then raised to about 275° C. and after about 1½ hours at this temperature, the mass begins to thicken and forms a very rubber-like sticky mass. On continued heating a gas is evolved and the mass becomes gel-like. The fragments of this gel are broken away from the sides of the flask with a stirring rod. They continue to remain springy for the remainder of the 3½-hour continued heating period. The product is then removed from the flask while still hot. At room temperature, it is found to be a very hard resin resembling that obtained in Example I.

*Example III*

A mixture of 15 g. of levo-pimaric acid-maleic anhydride adduct and 7.5 g. of glycerin is heated, as in Example I, in a bath at about 275° C.±5° C. for about 5½ hours. At the end of this time the product is very rubber-like and is removed from the flask while hot. On cooling, a very hard and insoluble resin is obtained.

It has been found that the products of the invention, in addition to their aforementioned utility as plastics, are also useful as bonding agents, as, for example, to cement metal parts. In such application, the metal surfaces are first coated with the glyceryl ester and heat then applied to effect polymerization.

Furthermore, use is found in the rubber-like properties of the polymerized product, since these compositions can be used at temperatures too high for ordinary rubbers.

Having thus described the invention, what is claimed is:

A process of forming a resin comprising heating a mixture of substantially pure levo-pimaric acid-maleic anhydride adduct and glycerin to form the glyceryl ester of the adduct, and polymerizing the ester by heating it at a temperature about from 250° to 300° C. to form an oil-insoluble, thermoset resin.

ELMER E. FLECK.

REFERENCES CITED

The following references are of record in the file of this patent:

UNITED STATES PATENTS

| Number | Name | Date |
|---|---|---|
| 2,033,133 | Ellis | Mar. 10, 1936 |
| 2,039,243 | Krzikalla et al. | Apr. 28, 1936 |
| 2,312,732 | Salathiel | Mar. 2, 1943 |
| 2,322,197 | Oswald | June 15, 1943 |
| 2,359,980 | Fleck | Oct. 10, 1944 |

OTHER REFERENCES

Mattiello, Protective and Decorative Coatings, vol. I, pages 185–6 (1941), pub. by John Wiley & Sons, N. Y.

Ruzicka et al., Jour. Soc. Chem. Ind., vol. 55, page 546 (1936).

Ruzicka et al., Helv. Chim. Acta, vol. 20, page 1552 (1937).